United States Patent
Iacovangelo

(10) Patent No.: US 6,420,032 B1
(45) Date of Patent: Jul. 16, 2002

(54) ADHESION LAYER FOR METAL OXIDE UV FILTERS

(75) Inventor: Charles Dominic Iacovangelo, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/271,657

(22) Filed: Mar. 17, 1999

(51) Int. Cl.⁷ ............................................. B32B 27/36
(52) U.S. Cl. ..................... 428/412; 428/457; 428/458; 428/469; 428/472
(58) Field of Search ................... 428/412, 457, 428/469, 332, 458, 472

(56) References Cited

U.S. PATENT DOCUMENTS

| | | |
|---|---|---|
| 3,161,615 A | 12/1964 | Goldberg |
| 3,220,973 A | 11/1965 | Goldberg |
| 3,312,659 A | 4/1967 | Kurkjy et al. |
| 3,312,660 A | 4/1967 | Kurkjy et al. |
| 3,313,777 A | 4/1967 | Elam et al. |
| 3,576,656 A | 4/1971 | Webb et al. |
| 3,666,614 A | 5/1972 | Snedeker et al. |
| 3,989,672 A | 11/1976 | Vestergaard |
| 4,194,038 A | 3/1980 | Baker et al. |
| 4,200,681 A | 4/1980 | Hall et al. |
| 4,210,699 A | 7/1980 | Schroeter et al. |
| 4,224,378 A | 9/1980 | Schroeter et al. |
| 4,242,381 A | 12/1980 | Goossens et al. |
| 4,454,275 A | 6/1984 | Rosenquist |
| 4,497,700 A | 2/1985 | Groth et al. ............ 204/192 P |
| 4,799,745 A * | 1/1989 | Meyer et al. .................. 359/360 |
| 4,842,941 A | 6/1989 | Devins et al. |
| 4,871,580 A | 10/1989 | Schram et al. |
| 4,927,704 A | 5/1990 | Reed et al. |
| 4,948,485 A | 8/1990 | Wallsten et al. |
| 4,959,257 A * | 9/1990 | Mukherjee .................. 428/156 |
| 5,008,148 A | 4/1991 | Thurm et al. |
| 5,051,308 A | 9/1991 | Reed et al. |
| 5,156,882 A | 10/1992 | Rzad et al. |
| 5,298,587 A | 3/1994 | Hu et al. |
| 5,320,875 A | 6/1994 | Hu et al. |
| 5,342,676 A * | 8/1994 | Zagdoun ..................... 428/216 |
| 5,433,786 A | 7/1995 | Hu et al. |
| 5,463,013 A | 10/1995 | Tokuda et al. |
| 5,480,722 A | 1/1996 | Tomonaga et al. |
| 5,494,712 A | 2/1996 | Hu et al. |
| 5,510,448 A | 4/1996 | Fontane et al. |
| 5,614,248 A | 3/1997 | Schiller et al. |
| 5,635,087 A | 6/1997 | Schiller et al. |
| 5,718,967 A | 2/1998 | Hu et al. |
| 5,763,063 A | 6/1998 | Pass et al. .................. 428/216 |

FOREIGN PATENT DOCUMENTS

| | | |
|---|---|---|
| EP | 0887433 | 12/1998 |
| WO | 8901957 | 8/1988 |
| WO | 9011975 | 10/1990 |
| WO | 9213517 | 2/1992 |
| WO | 9713802 | 10/1996 |

OTHER PUBLICATIONS

D. Raviendra and J.K. Sharma, Electroless Deposition of Cadmium Stannate, Zinc Oxide, and Aluminum–Doped Zinc Oxide Films, 58 J. Appl. Phys. 838–844 (1985).

(List continued on next page.)

Primary Examiner—Paul Thibodeau
Assistant Examiner—Monique R. Jackson
(74) Attorney, Agent, or Firm—Robert P. Santandrea; Noreen C. Johnson

(57) ABSTRACT

An adhesion promoting layer is formed between a transparent substrate and a metal oxide layer to prevent the metal oxide layer from delaminating from the substrate. Preferably, the substrate is a transparent polycarbonate, the adhesion promoting layer is a thin, transparent Al or Ag layer, and the metal oxide layer is ZnO, AZO or IZO UV radiation absorption layer. The layers are preferably deposited by arc plasma deposition or by sputtering.

38 Claims, 10 Drawing Sheets

OTHER PUBLICATIONS

R.E.I. Schropp et al., Transparent and Conductive Thin Films of ZnO for Photovoltaic Applications Prepared by RF Magentron Sputtering, 1 Conf. Rec. of 20th IEEE Photovoltaic Spec. Conf. 273–276 (Sep. 26, 1988).

B.E. Sernelius et al., Band–Gap Tailoring of ZnO by Means of Heavy Al Doping, 37 Physical Review B of Am. Phys. Soc., 10244–10248 (1998).

I. Shih and C.X. Qiu, Indium–Doped Zinc Oxide Thin Films Prepared by RF Magnetron Sputtering, 58 J. Appl. Phys 2400–2401 (1985).

S. Sreedhara Reddy et al., Optical Properties of Spray Deposited ZnO Films, 77 Solid State Communications 899–901 (1991).

D.A. Gerdeman and N.L. Hecht, *Arc Plasma Technology in Materials Science* 1–17 (1972).

S. Jager et al., Comparison of Transparent Conductive Oxide Thin Films Prepared by A.C. and D.C. Reactive Magnetron Sputtering, 98 Surface and Coatings Technology 1304–1314 (1998).

Jianhua Hu and Roy G. Gordon, Deposition of Boron Doped Zinc Oxide Films and Their Electrical and Optical Properties, 139 J. Electrochem. Soc. 2014–2022 (1992).

Z.–C. Jin et al., Optical Properties of Sputter–Depositied ZnO:Al Thin Films, 64 J. Appl. Phys. 5117–5131 (1988).

R.A. MacGill et al., Cathodic Arc Deposition of Copper Oxide Thin Films, 78 Surface and Coatings Technology 168–72 (1996).

S. Major et al., Electrical and Optical Transport in Undoped and Indium–doped Zinc Oxide Films, 1 J. Mater. Res. 300–310 (1986).

S. Major et al., Highly Transparent and Conducting Indium–Doped Zinc Oxide Films by Spray Pyrolysis, 108 Thin Solid Films 333–340 (1983).

S. Maniv et al., Transparent Conducting Zinc Oxide and Indium–Tin Oxide Films Prepared by Modified Reactive Planar Magnetron Sputtering, A1 J. Vac. Sci. Tech. 1370–1375 (1983).

Tadatsugu Minami et al., Group III Impurity Doped Zinc Oxide Thin Films Prepared by RF Magnetron Sputtering, 24 Japanese J. of Appl. Phy. L781–L784, (1985).

Tadatsugu Minami et al., Highly Conductive and Transparent Silicon Doped Zinc Oxide Thin Films Prepared by RF Magnetron Sputtering, 25 Japanese J. of Appl. Phys. L776–L779, (1986).

M. Miyazaki and E. Ando, Durability Improvement of Ag–Based Low–Emissivity Coatings, 178 J. Non–Crystalline Solids, 245–249 (1994).

C.X. Qiu and I. Shih, Tin– and Indium–Doped Zinc Oxide Films Prepared by RF Magnetron Sputtering, 13 Solar Energy Materials 75–84 (1986).

S. Anders et al., Formation of Metal Oxides by Cathodic Arc Deposition, 76–77 Surface and Coatings Technology 167–73 (1995).

H. Bolt et al., Gradient Metal—a–C:H Coatings Deposited From Dense Plasma by a Combined PVD/CVD Process, 98 Surface and Coatings Technol.ogy 1518–1523 (1998).

D.E. Brodie et al., Characterization of ZnO for the Fabrication of Conductor–Insulator–Semiconductor (CIS) Solar Cells, Conf. Proc. for IEEE 14th Photovoltaic Spec. Conf. 468–471 (Jan. 7–10, 1980).

* cited by examiner

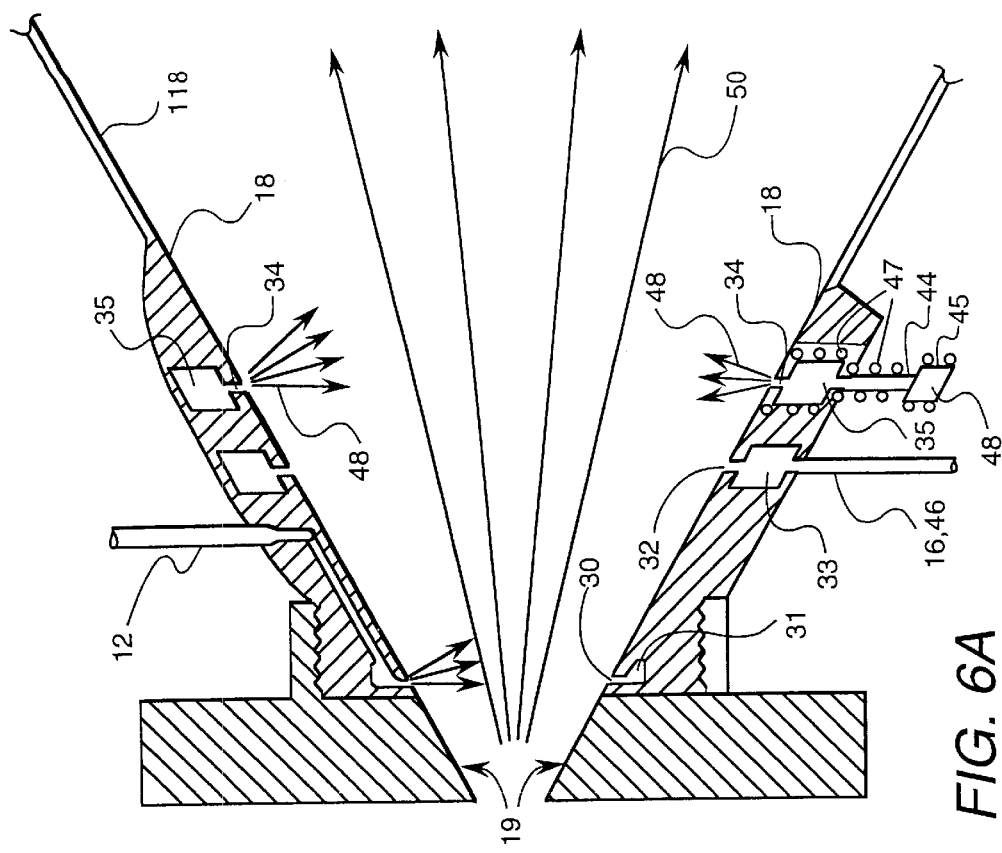
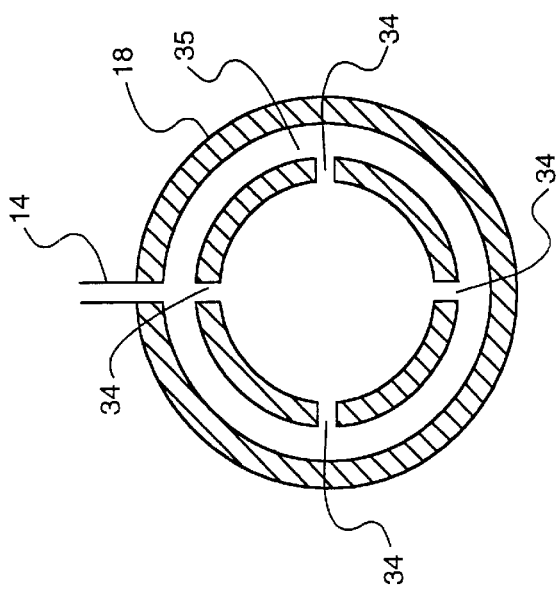
FIG. 6A
FIG. 5B

ADHESION LAYER FOR METAL OXIDE UV FILTERS

FIELD OF THE INVENTION

The present invention relates generally to an adhesion promoting layer for a transparent metal oxide layer on a substrate, and more particularly, to a metal adhesion and IR reflection layer for UV absorbing metal oxide coated polymeric windows.

BACKGROUND

Car manufacturers have traditionally used glass as the material for car windows. However, recently it has become desirable to substitute glass windows with polymeric windows, such as polycarbonate (PC) windows. Polymeric windows are often advantageous compared to glass windows because of their low weight, high strength and ease of shaping. However, some polymeric windows, such as PC windows, turn yellow after being exposed to the ultraviolet (UV) radiation in sunlight. The yellow windows suffer from poor transmission of visible light, thus making them unsuitable for many car window applications.

One solution to the UV damage problem is to coat the polymeric substrates with a $TiO_2$ (titanium dioxide) layer. The $TiO_2$ coating acts as a partial absorber of UV radiation, and provides a measure of protection for some applications. However, $TiO_2$ generally provides an insufficient amount of UV absorption, and windows coated with $TiO_2$ eventually turn a shade of yellow. $TiO_2$ is also a photocatalyst for oxidation of polymers. Therefore, $TiO_2$ coated polymers are generally unsuitable as a car window material.

Another solution to the UV damage problem is to coat the polymers with a ZnO (zinc oxide) layer. Zinc oxide provides a greater amount UV absorption than $TiO_2$. Therefore, polymers coated with ZnO generally do not turn yellow when exposed to sunlight. However, prior art ZnO coatings are known to dissolve in water. Poor water soak stability on many substrates, including polycarbonate (PC), has thus surfaced as one potential limitation to the use of ZnO as a UV absorber for car windows, because car windows are frequently exposed to rain and snow.

SUMMARY

In view of the foregoing, it would be desirable to provide a UV absorption layer for transparent substrates which provides a high UV absorption rate as well as good weather stability. A method of making a metal oxide layer that has good adhesion strength to a transparent substrate would also be desirable.

The present invention provides a substrate, a transparent metal layer on the substrate, and a transparent metal oxide layer.

The present invention also provides a window usable in a vehicle, building, apparatus, or display device, for example, comprising a polycarbonate base material, an infrared (IR) radiation reflection layer comprising aluminum or silver, and an ultraviolet (UV) radiation absorption layer comprising, for example, ZnO, indium doped zinc oxide (IZO) or aluminum doped zinc oxide (AZO).

The present invention also provides a method of coating a substrate, comprising the steps of forming a transparent metal layer on the substrate, and forming a transparent metal oxide layer on the metal layer.

BRIEF DESCRIPTION OF THE DRAWINGS

FIG. 5B is a front cross sectional view along line B–B' in FIG. 5A.

FIGS. 6A–E are cross sectional views of apparatus used to manufacture the glazed substrate according to some embodiments of the present invention.

DETAILED DESCRIPTION OF THE PREFERRED EMBODIMENTS

Figure 1:
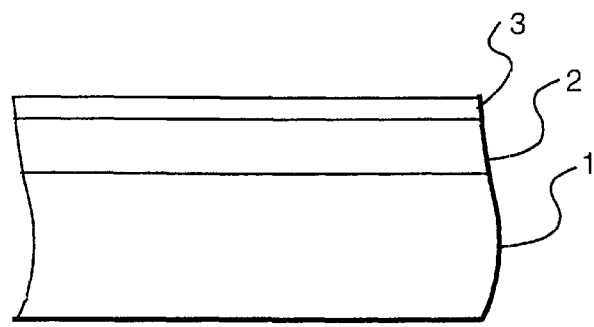
FIG. 1 is side cross sectional view of a glazed substrate according to a preferred embodiment of the present invention.

The present inventor has carried out a series of tests to determine the adhesion of ZnO layers to polymeric substrates after exposure to water at 65° C. for several hours. The ZnO layers deposited directly on the substrates by prior art methods, such as sputtering from ZnO targets, cracked and delaminated from a variety of substrates such as polycarbonate (PC) (sold under the trademark Lexan® by the General Electric Company), polyestercarbonate (PPC), polyethersulfone (PES) (sold under the trademark Radel® by Amoco), polyetherimide (PEI or polyimide) (sold under the trademark Ultem® by the General Electric Company), and acrylics. However, the present inventor discovered that the ZnO and doped ZnO (e.g. indium doped ZnO) layers have shown good water stability when formed on polycarbonate substrates coated with a silicone hardcoat (sold under the trademark "MR7" by the General Electric Company). This suggests that the problem is not an inherent instability of the metal oxide layer, but poor chemical bonding between the metal oxide layer and the polymeric substrate.

Therefore, one method to avoid the cracking and peeling problem is to coat the polymeric substrate with a material which is chemically compatible with both the polymeric substrate and the metal oxide UV absorbing layer, e.g., ZnO, IZO or AZO. One such material is a silicone hardcoat, as mentioned above, and as described in U.S. Pat. Nos. 4,842,941, 4,927,704, and 5,051,308, incorporated herein by reference. A typical silicone hardcoat is a composition comprising a dispersion of colloidal silica in lower aliphatic alcohol-water solution of the partial condensate of a silanol of the formula $RSi(OH)_3$ in which R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical. Typically, at least 70 weight percent of the silanol comprises $CH_3Si(OH)_3$, and the composition contains 10 to 50 weight percent solids. The solids consist essentially of 10 to 70 weight percent colloidal silica and 30 to 90 weight percent of the partial condensate. The silicone hard coat is also available commercially as MR7, AS4004, and AS4000 from the General Electric Company.

The silicone hardcoat, however, is relatively expensive and requires a curing step. Therefore it would be advantageous to coat the polymeric layer with an adhesion promoting layer that was less expensive than a silicone hardcoat, and which required no cure. Furthermore, the addition of an extra layer introduces additional cost. Therefore, it would be advantageous if the extra layer could also serve an additional function.

Metals, such as silver (Ag) and aluminum (Al) can provide these advantages. The metal coating is less expensive than a silicone hardcoat. Furthermore, metals such as Ag and Al are good IR reflectors. Thus, one metal layer may serve as both an adhesion promoter for the metal oxide UV absorption layer and as an IR reflecting layer. The IR reflecting layer, when coated on a car window, reduces and often prevents heat from building up in the cabin. This reduces occupant discomfort and lowers the load on the car air conditioning system. Therefore, polymeric windows that are coated with a metal IR reflecting layer and a metal oxide UV absorbing layer prevent the cabin from overheating and also prevent the polymeric window from turning yellow. Thus, in one embodiment, there is provided a structure comprising a substrate, a first layer that functions as both an adhesion promoter and an IR reflector and a second layer that functions as UV absorber.

While Ag and Al are preferred as the metal adhesion layers, other materials and metal layers, such as nickel, iron, copper, tin and gold may be used. The preferred adhesion layer materials do not absorb visible light. However, visible light absorbing materials may be used if a tinted window is desired. The material selected for the adhesion layer between the UV absorption layer and the substrate depends on a variety of mechanical properties such as coefficient of thermal expansion and elastic modulus as well as water soak stability and adhesion. For example, the coefficients of thermal expansion of polycarbonate and ZnO are $70 \times 10^{-6}$ in/in °C. and $5.6 \times 10^{-6}$ in/in °C., respectively. The coefficients of thermal expansion of Ag and Al are $17 \times 10^{-6}$ in/in °C. and $22.4 \times 10^{-6}$ in/in °C., respectively. Thus, the coefficients of thermal expansion for Ag and Al are less than that of polycarbonate, but greater than that of ZnO.

Furthermore, while the preferred application of the present invention is glazing of polymeric car windows, the adhesion promoting and UV absorption layers of the present invention may be used in many other applications, including, for example, building windows, airplane and boat windows, architectural materials, manufacturing apparatus portholes (e.g. viewing areas that allow the user to look inside an industrial manufacturing apparatus) and transparent substrates for electronic devices and display device screens, such as television, LCD and plasma display screens. The substrate may also be a body panel for a car, for example.

A preferred embodiment of the present invention is shown in FIG. 1. A substrate 1 is coated with an adhesion promoting layer 2 and a UV absorption layer 3. The thickness of each layer is not necessarily to scale. The adhesion promoting layer 2 and the UV absorption layer 3 may be formed on both sides of substrate 1 if desired.

The substrate, according to exemplary embodiments of the invention, typically comprises a polymer resin. For example, the substrate may comprise a polycarbonate. Polycarbonates suitable for forming the substrate are well-known in the art and generally comprise repeating units of the formula:

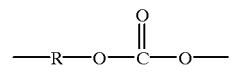

where R is a divalent aromatic radical of a dihydric phenol (e.g., a radical of 2,2-bis(4-hydroxyphenyl)-propane, also known as bisphenol A) employed in the polymer producing reaction; or an organic polycarboxylic acid (e.g. terphthalic acid, isophthalic acid, hexahydrophthalic acid, adipic acid, sebacic acid, dodecanedioic acid, and the like). These polycarbonate resins are aromatic carbonate polymers which may be prepared by reacting one or more dihydric phenols with a carbonate precursor such as phosgene, a haloformate or a carbonate ester. One example of a polycarbonate which can be used is LEXAN®, manufactured by General Electric Company.

Aromatic carbonate polymers may be prepared by methods well known in the art as described, for example, in U.S. Pat. Nos. 3,161,615; 3,220,973; 3,312,659; 3,312,660; 3,313,777; 3,666,614; 3,989,672; 4,200,681; 4,842,941; and 4,210,699, all of which are incorporated herein by reference.

The substrate may also comprise a polyestercarbonate which can be prepared by reacting a carbonate precursor, a dihydric phenol, and a dicarboxylic acid or ester forming derivative thereof. Polyestercarbonates are described, for example, in U.S. Pat. Nos. 4,454,275; 5,510,448; 4,194,038; and 5,463,013.

The substrate may also comprise a thermoplastic or thermoset material. Examples of suitable thermoplastic materials include polyethylene, polypropylene, polystyrene, polyvinylacetate, polyvinylalcohol, polyvinylacetal, polymethacrylate ester, polyacrylic acids, polyether, polyester, polycarbonate, cellulous resin, polyacrylonitrile, polyamide, polyimide, polyvinylchloride, fluorine containing resins and polysulfone. Examples of suitable thermoset materials include epoxy and urea melamine.

Acrylic polymers, also well known in the art, are another material from which the substrate may be formed. Acrylic polymers can be prepared from monomers such as methyl acrylate, acrylic acid, methacrylic acid, methyl methacrylate, butyl methacrylate, cyclohexyl methacrylate, and the like. Substituted acrylates and methacrylates, such as hydroxyethyl acrylate, hydroxybutyl acrylate, 2-ethylhexylacrylate, and n-butylacrylate may also be used.

Polyesters can also be used to form the substrate. Polyesters are well-known in the art, and may be prepared by the polyesterification of organic polycarboxylic acids (e.g., phthalic acid, hexahydrophthalic acid, adipic acid, maleic acid, terphthalic acid, isophthalic acid, sebacic acid, dodecanedioic acid, and the like) or their anhydrides with organic polyols containing primary or secondary hydroxyl groups (e.g., ethylene glycol, butylene glycol, neopentyl glycol, and cyclohexanedimethanol).

Polyurethanes are another class of materials which can be used to form the substrate. Polyurethanes are well-known in the art, and are prepared by the reaction of a polyisocyanate and a polyol. Examples of useful polyisocyanates include hexamethylene diisocyanate, toluene diisocyanate, MDI, isophorone diisocyanate, and biurets and triisocyanurates of these diisocyanates. Examples of useful polyols include low molecular weight aliphatic polyols, polyester polyols, polyether polyols, fatty alcohols, and the like.

Examples of other materials from which the substrate may be formed include acrylonitrile-butadiene-styrene, glass, VALOX® (polybutylenephthalate, available from General Electric Co.), XENOY® (a blend of LEXAN® and VALOX®, available from General Electric Co.), and the like. Typically, the substrate comprises a clear polymeric material, such as PC, PPC, PES, PEI or acrylic.

The substrate can be formed in a conventional manner, for example by injection molding, extrusion, cold forming, vacuum forming, blow molding, compression molding, transfer molding, thermal forming, and the like. The article may be in any shape and need not be a finished article of commerce, that is, it may be sheet material or film which would be cut or sized or mechanically shaped into a finished article. The substrate may be transparent or not transparent. The substrate may be rigid or flexible.

Figure 2A:
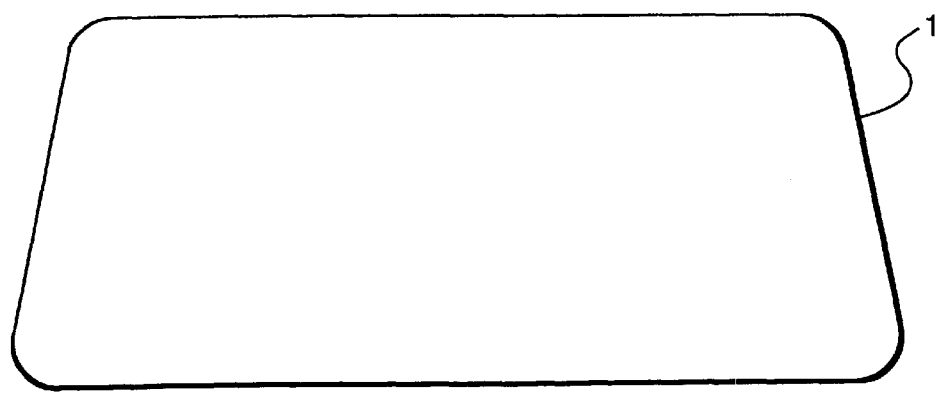
FIG. 2A is a plane view of the substrate shaped for use as a vehicle window.

The substrate is preferably a vehicle window, such as a car, truck, motorcycle, tractor, boat or air plane window, as shown in FIG. 2A. The substrate may also comprise a display screen, such as a television screen, LCD screen, computer monitor screen, a plasma display screen or a glare guard for a computer monitor. These screens also benefit from being coated with a UV absorption and IR reflection layers to prevent the screen from turning yellow and to prevent UV radiation and heat from damaging electronic components inside the display.

Figure 2B:
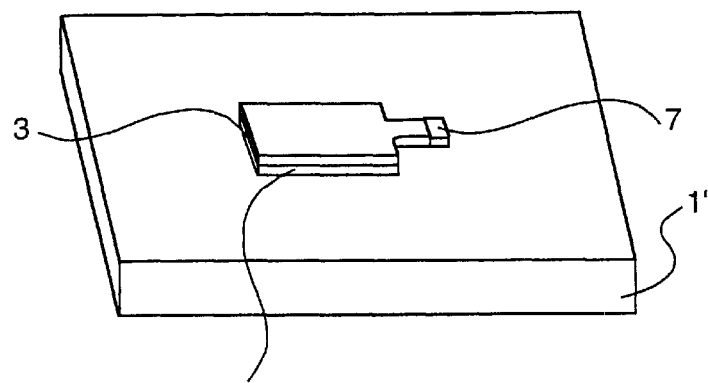
FIG. 2B is perspective view of the substrate shaped for use as an electronic device substrate.

The substrate may also comprise an electronic device substrate, such as a solar cell or a liquid crystal display (LCD) substrate, as shown in FIG. 2B. In an LCD, a transparent, conductive metal oxide electrode 3 is used to apply a potential to the overlying liquid crystal material (not shown). The metal oxide layer 3 may comprise IZO, AZO or indium tin oxide (ITO), for example. The transparent adhesion layer 2, comprising a metal such as Al or Ag, may be formed under the entire electrode 3 to prevent it from delaminating from the substrate 1 and to increase the conductivity of the electrode 3. As shown in FIG. 2B, a transistor or diode 7, such as a TFT or MIM, periodically supplies current to the electrode 3.

The adhesion promoting layer 2 is typically a metal layer. Preferred metal layers include at least one of Ag and Al. The adhesion promoting layer 2 is advantageously about 10 to 200 nm thick. Preferably, layer 2 is 10 to 40 nm thick. This thickness provides a desirable amount of adhesion for the overlying UV absorption layer 3 and light transmission through the transparent substrate 1.

The UV absorption layer 3 is typically a metal oxide layer. Preferred metal oxide layers include at least one of ZnO, IZO, AZO, and ZnS. However, other UV absorbing metal oxide layers, such as titanium dioxide ($TiO_2$), tantalum pentoxide ($Ta_2O_5$), niobium oxide ($Nb_2O_3$), cerium dioxide ($CeO_2$), indium oxide ($In_2O_3$), indium tin oxide (ITO), and ZnO doped with fluorine, boron, aluminum, gallium, thallium, copper, or iron may be used if desired. The metal oxide UV absorbing layer 3 is generally about 10 to 10,000 nm thick. Preferably, layer 3 is 400 to 600 nm thick. This thickness provides a desirable amount of UV absorption and light transmission through the transparent substrate 1 in some instances.

If the UV absorbing layer 3 comprises IZO, then indium may advantageously comprise 2 to 15 atomic percent of the total metal content: $In_{0.02-0.15}Zn_{0.98-0.85}O$. It was conventionally thought that IZO loses its UV absorption edge (i.e. fails to absorb UV radiation) if its indium content exceeds 3 atomic percent of the total metal content. However, the present inventor determined that IZO layers formed according to the exemplary embodiments of the present invention maintain their UV absorption edge when their indium content is up to 15 atomic percent of the total metal content. This discovery provides several advantages. First, because IZO is electrically conductive, it may serve as both a UV absorbing layer and as a conductor of electricity. The relatively high indium content (i.e. from about 2 to about 15 atomic %) allows for improved conductivity. For example, the IZO layer of the present invention may be used additionally as a window defogger on an automobile window because the IZO layer is invisible.

Another application of the IZO layer may be as a part of a theft or damage sensor. A window coated with the IZO layer may carry a low current passed through the IZO layer. When a window is cracked or chemically etched, the current flow through the IZO is interrupted which sets off an alarm indicating a crack or chemical damage to the window.

Figure 3A:
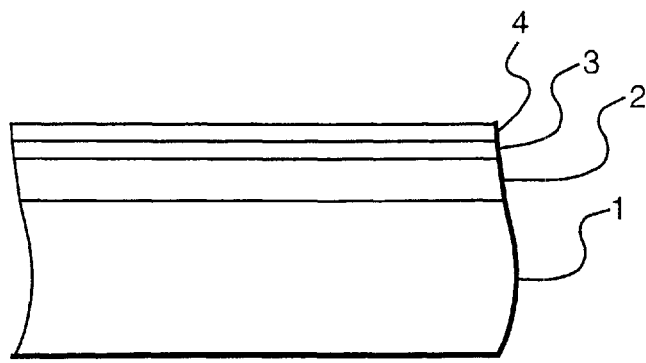
FIGS. 3A–E are side cross sectional views of a glazed substrate according to some embodiments of the present invention.

An alternative embodiment of the present invention Is shown in FIG. 3A. In this embodiment, an optional scratch or abrasion resistant coating or layer 4 is formed over the UV absorbing layer 3. The abrasion resistant layer 4 prevents the UV absorption layer 3 from being scratched during use. The abrasion resistant layer may comprise any scratch or abrasion resistant and UV stable material. The abrasion resistant layer 5 may comprise, for example, a plasma polymerized organosilicon material, as described in U.S. Ser. No. 09/271,654, pending entitled "Multilayer Article and Method of Making by Arc Plasma Deposition", by Iacovangelo et al., filed on the same day as the present application, which is hereby incorporated by reference. The organosilicon material may comprise, for example, octamethylcyclotetrasiloxane (D4) tetramethyldisiloxane (TMDSO), hexamethyldisiloxane (HMDSO), or other organosilicon, as described in the above application. The organosilicon monomers are oxidized, decomposed, and polymerized in an arc plasma deposition apparatus, typically with a stoichiometric excess of oxygen, to form an abrasion resistant layer which comprises an oxidized D4, TMDSO, or HMDSO layer, for example. Such an abrasion resistant layer may be referred to as a $SiO_x$ layer. However, the $SiO_x$ layer may also contain hydrogen and carbon atoms in which case it is generally referred to as $SiO_xC_yH_z$.

Other examples of compounds and materials suitable for the as abrasion-resistant material include silicon dioxide and aluminum oxide, for example.

Figure 3B:
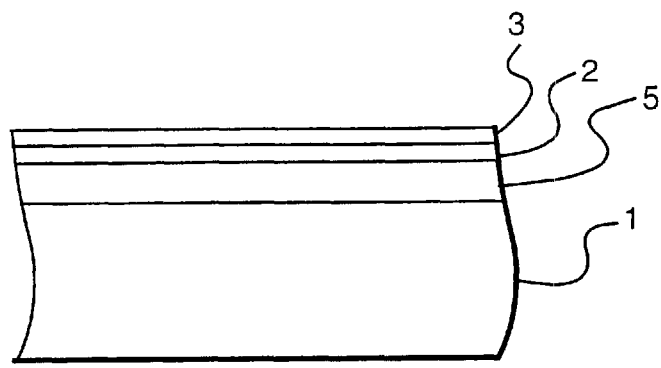

Another alternative embodiment of the present invention is shown in FIG. 3B. In this embodiment, an interlayer 5 is formed between the substrate 1 and the adhesion promoting layer 2. The term "interlayer" refers to a layer situated between the substrate and another layer, or between two layers of the multilayer structure. The interlayer 5 relieves stress between the substrate 1 and the overlying layers. Stress may occur, for example, due to different coefficients of thermal expansion, different ductility, and different elastic moduli between the substrate 1 and the overlying layers. Preferably, the interlayer 5 comprises a material which has a value of coefficient of thermal expansion, ductility, and elastic modulus which is between the corresponding values of the substrate and the overlying layers. One example of a suitable interlayer material is a plasma polymerized organosilicon, as described in the above-referenced application Ser. No. 09/271,654, pending entitled "Multilayer Article and Method of Making by Arc Plasma Deposition".

Figure 3C:
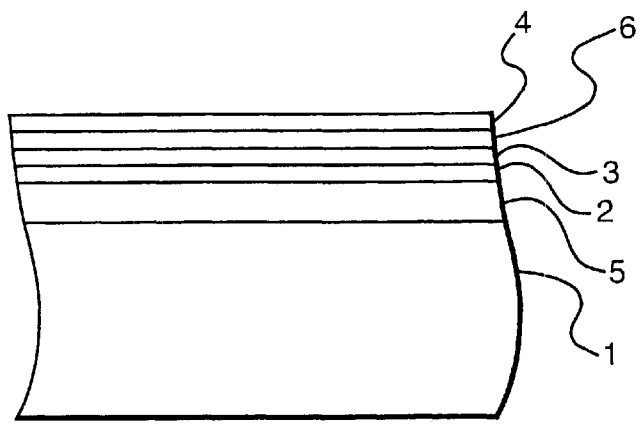
Figure 3D:
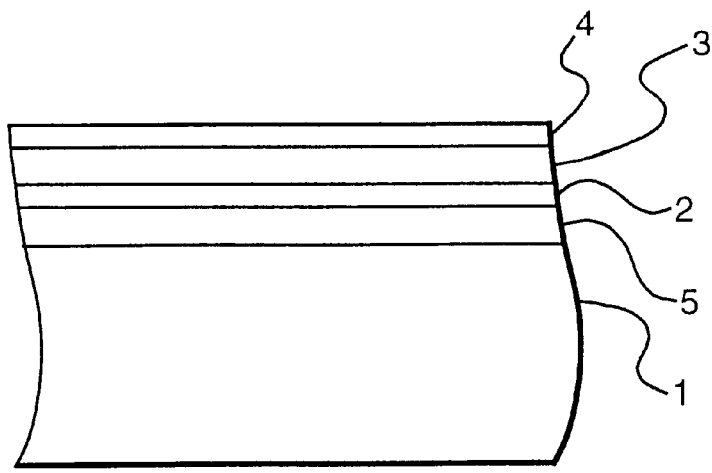
Figure 3E:
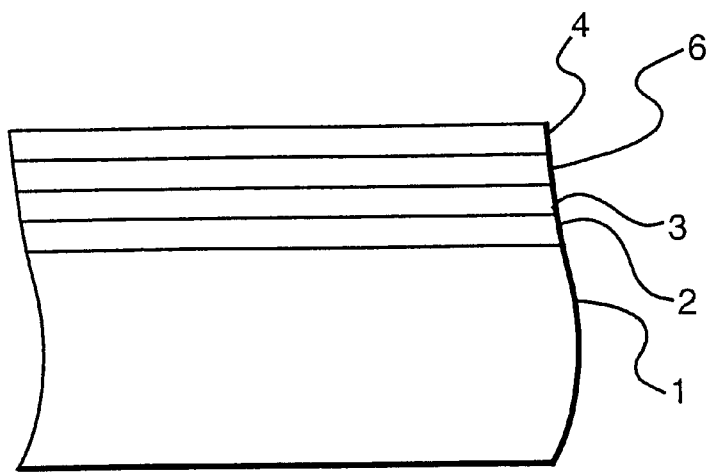

In another embodiment of the invention, a second interlayer 6 may be formed between the metal oxide UV absorption layer 3 and the abrasion resistant layer 4, as shown in FIG. 3C. The interlayer 6 relieves stress between layers 3 and 4 that occurs due to different coefficients of thermal expansion, different ductility, and different elastic modulus of layers 3 and 4. Layer 6 may comprise, for example, aluminum or a plasma polymerized organosilicon material. Interlayer 6 is optional and may be omitted, as shown in FIG. 3D. Likewise, interlayer 5 is optional, and may be omitted, as shown in FIG. 3E.

The adhesion promoting layer 2 may be fabricated on the substrate 1 by a variety of methods. For example, sputtering, metal organic chemical vapor deposition (MOCVD), arc plasma deposition, evaporation, and electron beam evaporation may be used to deposit the adhesion promoting layer 2 if it is a metal layer, such as Al or Ag. The preferred methods of forming layer 2 are DC or RF magnetron sputtering and arc plasma deposition. However, non-magnetron DC, RF or microwave sputtering may also be used.

The UV absorbing layer 3 may also be deposited by a variety of methods, such as chemical vapor deposition (CVD), evaporation (thermal, RF or electron beam), reactive evaporation, activated reactive evaporation, sputtering (DC, RF, microwave and/or magnetron), arc plasma deposition, and reactive sputtering. However, arc plasma deposition and reactive sputtering are preferred.

In an arc plasma deposition process according to an exemplary embodiment of the invention, an arc is generated between a cathode and an anode which are located in a first chamber. The anode has a central aperture, typically in the form of a portion of a diverging cone, which opens into a low pressure second chamber. A carrier gas, introduced proximate to the cathode, is ionized by the arc between the cathode and anode to form a plasma. The plasma flows into the second chamber at high velocity due to the pressure difference between the chambers. Upon entering the second chamber, one or more reagents are fed into the plasma, which projects the reagents onto the substrate, and which also enables the reagents to undergo reactions such as polymerization, oxidation, decomposition, etc. The second chamber may include a diverging, e.g. conical, nozzle which extends from the diverging aperture of the anode. The nozzle at its narrow end concentrates the plasma and reagents to enhance chemical reactions. At the wide end of the nozzle, the area of the plasma is substantially increased to provide a larger deposition area.

Figure 4:
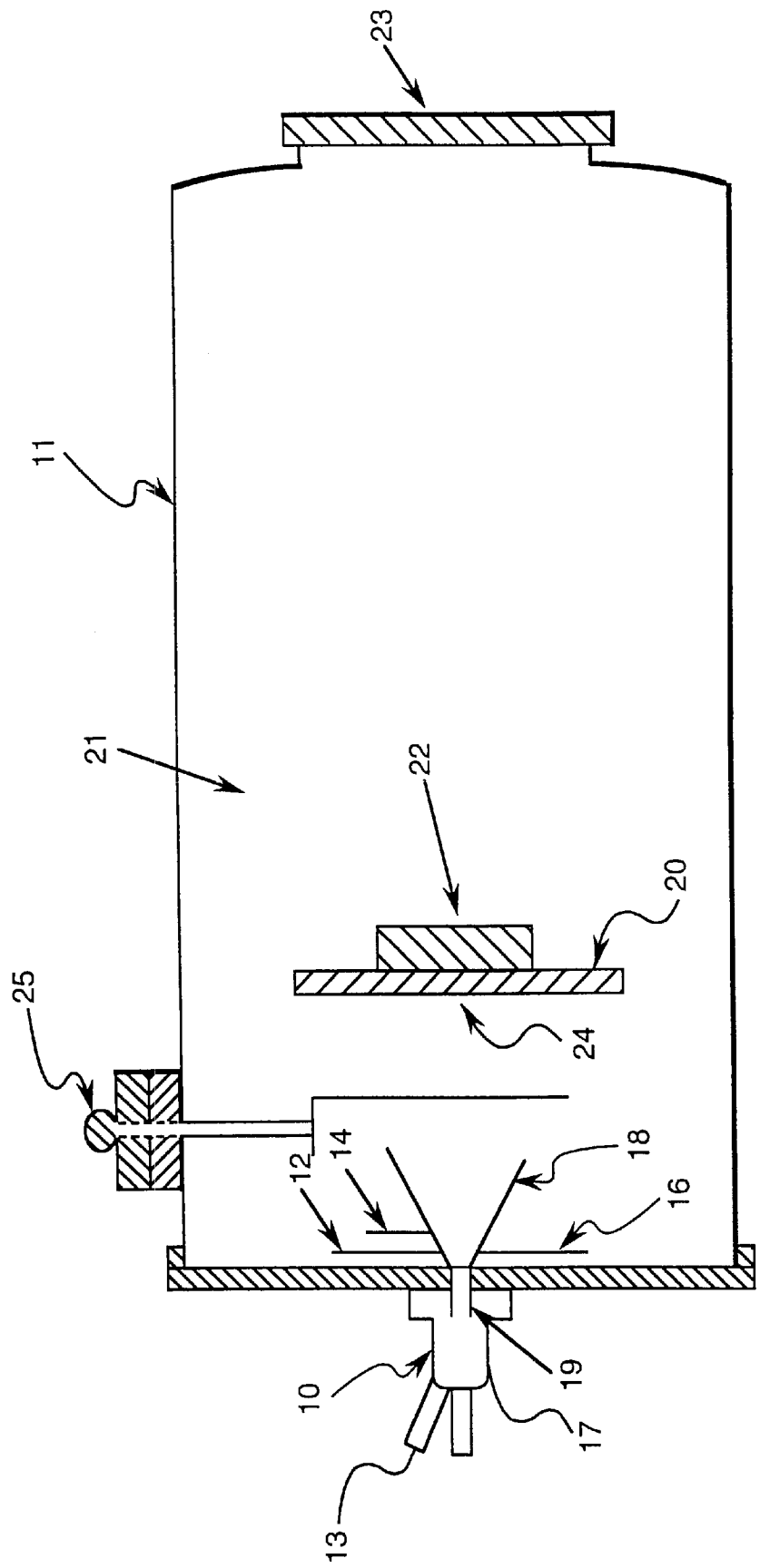
FIG. 4 is a side cross sectional view of an apparatus used to manufacture the glazed substrate according to an exemplary embodiment of the present invention.

An example of an arc plasma deposition apparatus for depositing the metal oxide UV absorbing layer 3 is shown in FIG. 4. The apparatus comprises a plasma generation chamber 10 and a deposition chamber 11. The deposition chamber 11 contains a substrate 20 mounted on a temperature controlled support 22. The substrate 20 may be a transparent glass or polymeric substrate 1 coated with the adhesion promoting layer 2, shown in FIG. 1. The deposition chamber also contains a door (not shown) for loading and unloading the substrate 20 and an outlet 23 for connecting to a pump. The support 22 may be positioned at any position in volume 21 of deposition chamber 11. Preferably, the substrate 20 is positioned 10 to 50 cm, typically about 25.5 cm, from the anode of the plasma generator.

The deposition chamber 11 also optionally comprises a retractable shutter 24. The shutter may be positioned, for example, by a handle 25 or by a computer controlled positioning mechanism. The shutter 24 may also contain a circular aperture to control the diameter of the plasma that emanates from the plasma generation chamber 10 towards the substrate 20. The deposition chamber 11 may also optionally comprise magnets or magnetic field generating coils (not shown) adjacent to chamber walls to direct the flow of the plasma.

The deposition chamber 11 may also contain an optional nozzle 18. The nozzle 18 provides improved control of the injection, ionization and reaction of the reactants to be deposited on the substrate 20. The nozzle 18 provides for the deposition of a material such as a solid metal oxide film or layer on the substrate 20 and minimizes or even prevents formation of powdery reactant deposits on the substrate 20. Preferably, the nozzle 18, if employed, has a conical shape with a divergent angle of about 40 degrees and a length of about 10 to 80 cm, preferably about 16 cm. However, the nozzle 18 may alternatively have a variable cross section, such as such as conical-cylindrical-conical or conical cylindrical. Furthermore, the nozzle 18 may have a divergent angle other than 40 degrees and a length other than 16 cm. The nozzle may also be omitted entirely.

The deposition chamber 11 also contains at least one reactant supply line. For example, the deposition chamber 11 may contain an oxygen supply line 12 and a zinc supply line 14 to deposit a ZnO film on the substrate 20. The deposition chamber 11 may also contain, for example, a third indium or aluminum supply line 16 to deposit IZO or AZO. The supply lines 12, 14, 16 preferably communicate with the nozzle 18 and supply reactants into the plasma flowing through the nozzle. The deposition chamber 11 also generally contains vacuum pumps (not shown) for evacuating the chamber 11.

Figure 5A:
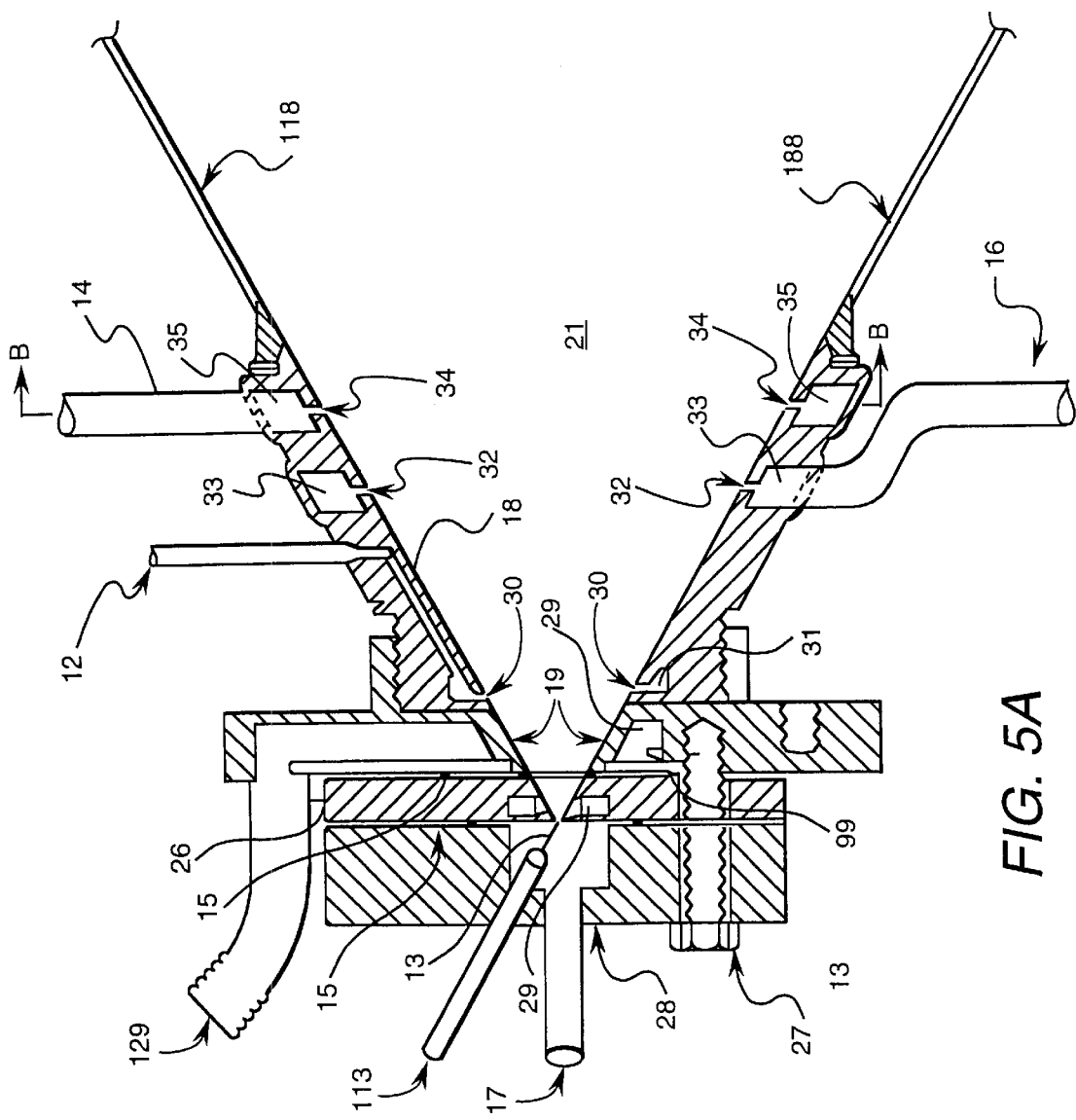
FIG. 5A is a side cross sectional view of a portion of the apparatus shown in FIG. 4.

The plasma generation chamber 10 contains at least one cathode 13, a plasma gas supply line 17 and an anode 19. The plasma generation chamber 10 is shown in more detail in FIG. 5A. The plasma generation chamber 10 typically comprises three cathodes 13. The cathodes 13 may comprise, for example, tungsten or thorium doped tungsten tips. The use of thorium allows the temperature of the tips to be maintained below the melting point of tungsten, thus avoiding contamination of the plasma with tungsten atoms. The cathodes 13 may be surrounded by a cathode housing 113 to isolate each cathode 13 from the walls of the cathode support plate 28. The cathode housing 113 may comprise a shell surrounding an isolating mantle made from an insulating material such as quartz. The anode typically has a central aperture which diverges. For example, as shown in FIG. 5A, the anode may have a conically diverging central aperture.

The cathodes 13 are preferably separated from the anode 19 by at least one cascade plate 26. The cascade plate(s) preferably comprise copper discs containing a central aperture. The cascade plate(s) preferably comprise copper discs containing a central aperture which typically diverges in the shape of a cone to match the shape of the anode aperture. However, other configurations may be used.

The cathode support plate 28 may suitably be attached to the cascade plate(s) 26 and the anode 19 by an insulated bolt 27 or by other fasteners. The cascade plate 26 is electrically insulated from the cathode support plate 28 and the anode 19 by spacers 15. Spacers 15 may comprise, for example, O-ring vacuum seals, polyvinylchloride rings and/or boron nitride rings.

Plasma discharge at high power density and high temperature tends to heat the cascade plate(s) 26 and the anode 19. Preferably, the cascade plate(s) 26 and the anode 19 include cooling channels 29 and 99, respectively. Typically, the channels 29 and 99 have a circular shape within the interior volume of the plate(s) 26 and the anode 19. Chilled water supplied through a water supply line 129 flows through the channel 99 to cool the anode 19 during operation. A similar water supply line (not shown) supplies water to the channel 29 to cool the cascade plate(s) 26.

The plasma generation chamber 10 generally includes at least one plasma gas supply line 17. The plasma generation chamber 10 may also contain a purging gas supply line adjacent to the carrier gas supply line 17 to supply a purging gas to chambers 10 and 11 prior to supplying the plasma gas.

The nozzle 18 is preferably attached to and extends from the anode 19. The nozzle 18 contains an optional integral or removable divergent extension portion 118 for directing the plasma and reactive species flow. Preferably, the reactant supply line(s) 12, 14 and 16 are in contact with the nozzle 18. The nozzle 18 may contain a showerhead inlet supply line which comprises at least one ring shaped reactant supply channel connected to injection holes. For example, as shown in FIG. 5C, reactant supply line 14 connects to reactant supply channel 35 formed inside the body of the nozzle 18. Reactant supply channel 35 generally contains a plurality of openings 34, which are preferably evenly distributed around the circumference of channel 35. The reactant flows from line 14 into the channel 35. The reactant then flows from the channel 35 simultaneously through openings 34 to enter the plasma emanating from anode 19 into deposition chamber space 21, from several directions. Likewise, supply line 16 is connected to channel 33 and openings 32 and supply line 12 is connected to channel 31 and openings 30. However, the channel and openings may be omitted and the supply lines may deposit the reactants directly into the plasma.

To form a plasma in the plasma generation chamber 10, a plasma gas is supplied through plasma gas supply line 17. The plasma gas may suitably comprise a noble gas, such as argon or helium, or a reactive gas, such as nitrogen, ammonia, carbon dioxide or hydrogen or any mixture thereof. If there is more than one plasma gas, then the plural gasses may be supplied through plural supply lines, if desired. Preferably, the plasma gas comprises argon or a combination of argon and oxygen. The plasma gas in plasma generation chamber 10 is maintained at a higher pressure than the pressure in the deposition chamber 11, which is continuously evacuated by a pump. An arc voltage is then applied between the cathode(s) 13 and the anode 19 to generate a plasma in the plasma generation chamber 10. The plasma then extends through the aperture of the anode 19 into the deposition chamber 11 due to the pressure difference between chambers 10 and 11.

The reactants are supplied into the plasma through supply lines 12, 14, 16. For example, oxygen gas may be supplied through line 12, zinc may be supplied through line 14 and indium or aluminum may be supplied through line 16 to form an IZO or AZO film 3 on substrate 20. However, line 16 may be sealed or inactive if ZnO or other two-element material is to be deposited. Zinc and indium or aluminum may be supplied through the same line (14 or 16). Of course the supply line location may be altered, and oxygen may be supplied through line 14 or 16, etc.

Zinc, indium, and aluminum reactants may be supplied though a supply line in the form of an organometallic gas or liquid, such as diethyl zinc, dimethyl zinc, triethyl indium, trimethyl indium, triethyl aluminum or trimethyl aluminum, which disassociates in the plasma stream. An organometallic compound refers to an organic compound comprising a metal attached directly to a carbon.

Preferably, the zinc, indium and/or aluminum reactants are supplied in the form of a vapor. To generate a metal vapor, the metal supply line may be altered as shown in FIG. 6A. The metal supply line 14 (or 12 or 16, as necessary) may be replaced by a tube 44, such as a stainless steel tube. The tube 44 is attached to a crucible 45, such as a nickel crucible with a tantalum liner. The crucible is surrounded by a heating element 47, such as a high resistance wire or RF coils. The heating element is also preferably wrapped around the tube 44. The heating element is kept at a temperature sufficient to prevent the metal from solidifying in the tube 44. Preferably, the heating element 47 also extends to the nozzle 18 to prevent the metal from solidifying therein.

The metal reactant 48 is generally loaded into the crucible 47 such that the reactant abuts the pipe 44. The heating element is activated to evaporate the metal reactant 48 into the pipe 44. The metal reactant is then fed into the plasma 50 from pipe 44 through channel 35 and openings 34. To deposit a ZnO film, the metal reactant is zinc. To deposit an IZO film, the metal reactant 48 may be an In:Zn alloy, such as 2.5 atomic % In:Zn. To deposit an AZO film, the metal reactant 40 may be an Al:Zn alloy. Of course other metal oxide films, such as $CeO_2$, $In_2O_3$, ITO, and $TiO_2$ may be deposited. Alternatively, the metal reactant may be evaporated from a continuously supplied metal wire. The details of pressure, temperature and other parameters are described in U.S. Ser. No. 09/271,655, pending by Iacovangelo et al, entitled "Method and Apparatus for Arc Plasma Deposition with Evaporation of Reagents", filed on the same day as the present application, which is hereby incorporated in its entirety by reference.

Alternatively, the indium or aluminum vapor may be supplied through a separate conduit from the zinc vapor conduit. In this embodiment, the second metal supply line 16 is replaced with a second tube 46 and a second crucible containing indium or aluminum. The zinc and indium or aluminum vapor enter the plasma, where it mixes with oxygen supplied through supply line 12. The metal and oxygen reactants mix in the plasma 50 to form ZnO, IZO or AZO which deposits on the substrate 20 as a thin film as the plasma strikes the substrate.

Figure 6B:
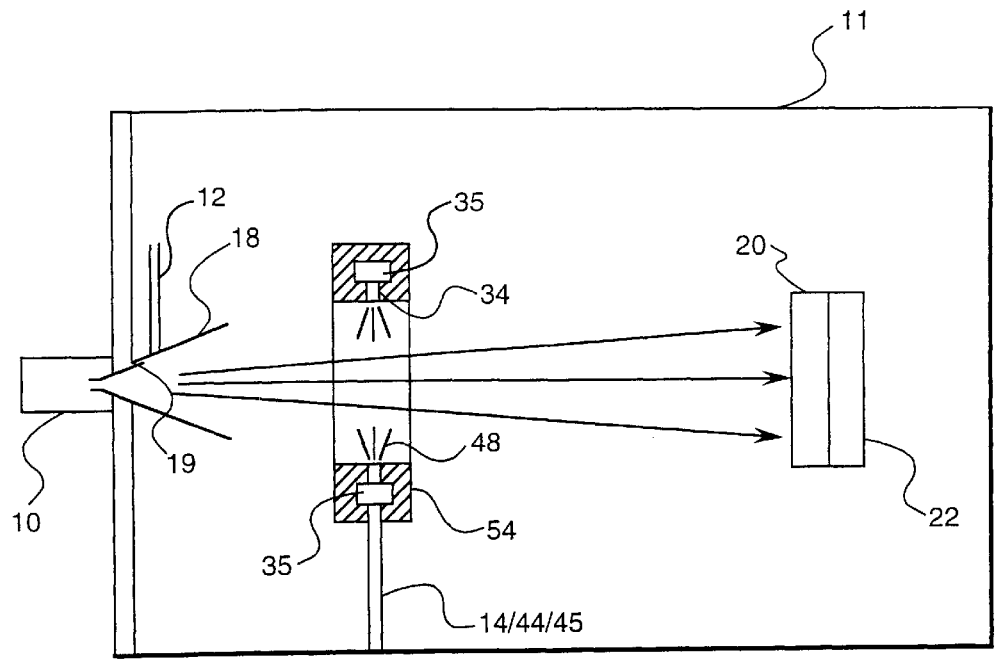

In an alternative embodiment, at least one reactant inlet, such as a metal reactant inlet 54, is located distal from the anode 19, as shown in FIG. 6B. The inlet 54 may, for example, have a ring shape with a wide aperture in the center of the ring. The inlet preferably contains a reactant supply channel 35 and reactant supply openings 34. The reactant supply channel 35 may have an annular shape inside the volume of the inlet 54 with at least one supply opening leading out toward the center aperture of the inlet 54. The plasma 50 passes through the aperture in the inlet 54. The reactant is supplied to channel 35 through a supply line 14 if the reactant is a gas or through a pipe 44 and crucible 45 if the reactant is a vapor. The reactant 48 enters the plasma 50 from plural openings 34. In this embodiment, the nozzle 18 may be omitted because the inlet 54 controls the shape and direction of the plasma 50.

Figure 6C:
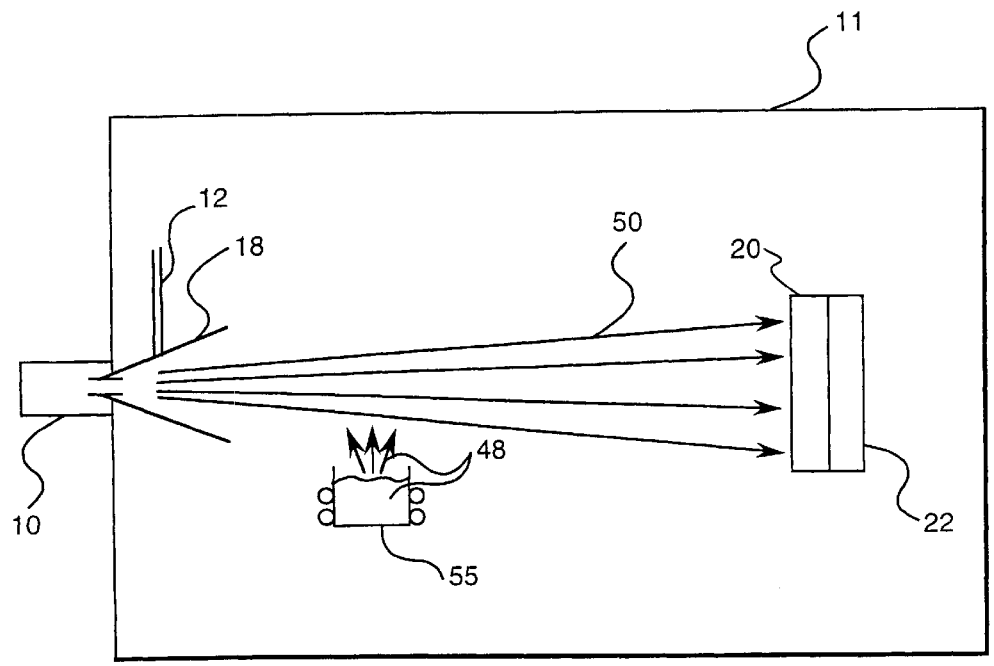

In another embodiment, the reactant inlet may comprise a crucible 55, as shown in FIG. 6C. Solid Zn, In, Al, In:Zn or Al:Zn 48 may be evaporated from the crucible 55 directly into the plasma 50.

Figure 6D:
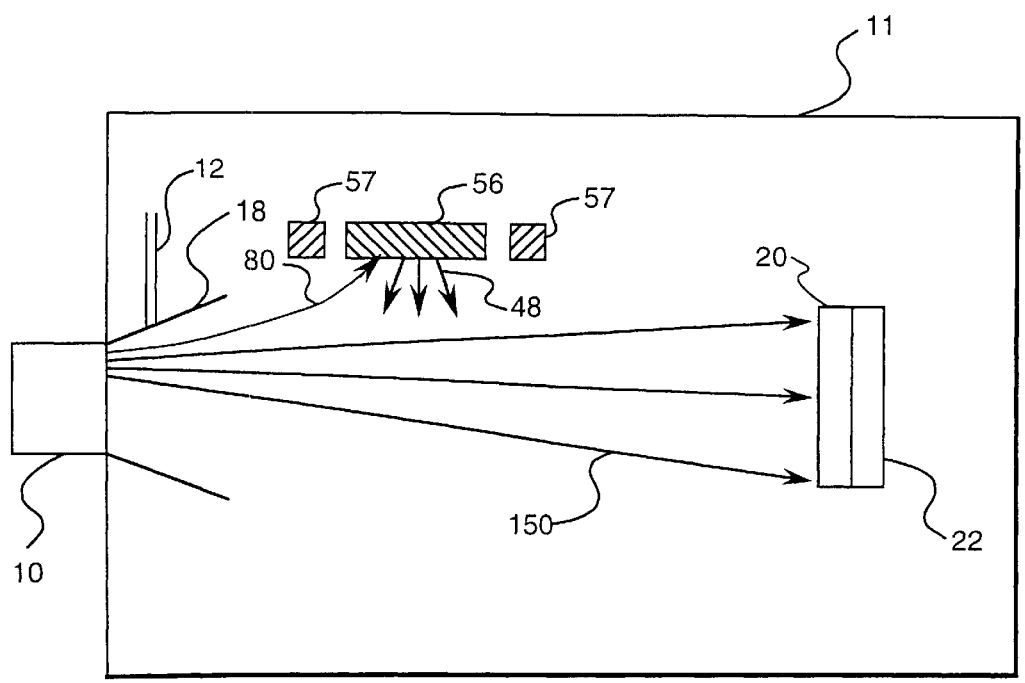

In yet another embodiment, the reactant source may comprise a biased sputtering target 56 (e.g. cathode) adjacent to a biased anode 57, as shown in FIG. 6D. Edge portions of the plasma 150 are drawn to the biased target 56 and sputter off target atoms 48, that drift into the main portion of the plasma 50. The reactant atoms combine in the plasma and are deposited on the substrate 20. The target 56 may comprise, for example, Zn, In, Al, In:Zn, Al:Zn, ZnO, IZO or AZO. If the target 56 contains oxygen, then a separate source of oxygen may be omitted. Likewise, the nozzle 18 may be omitted if desired.

Figure 6E:
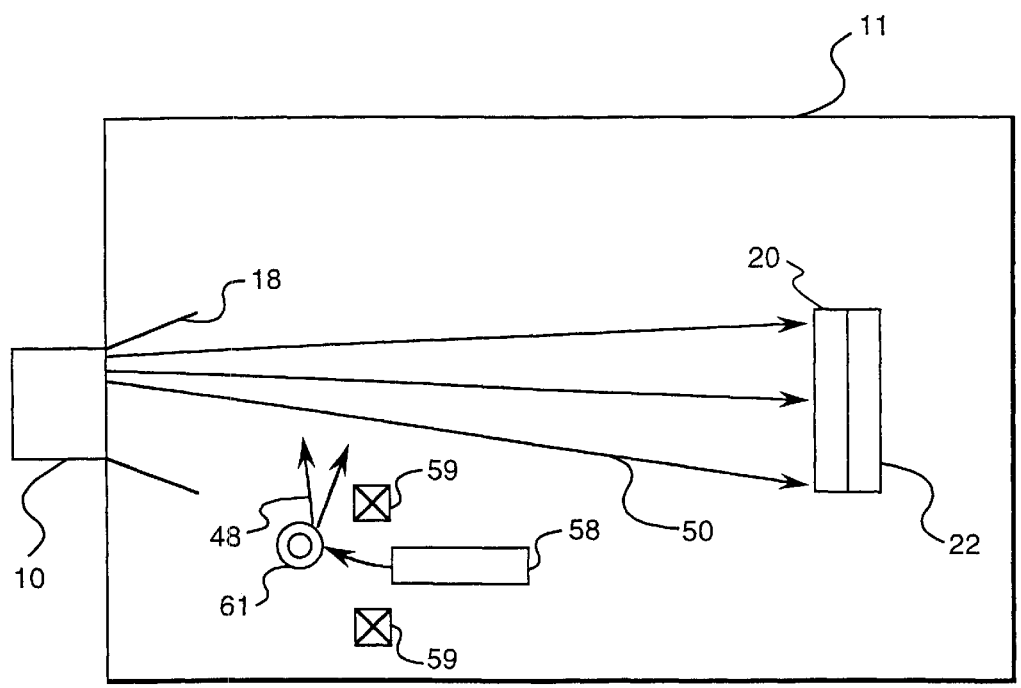

In another embodiment, the reactant source comprises a electron beam evaporation system, as shown in FIG. 6E. An electron gun 58 emits a beam of electrons 60. The electron beam is directed toward a reactant target 61 by magnet(s) 59. As the electron beam 60 strikes the reactant target 61, it evaporates reactant atoms 48 from the reactant target.

Preferably, the reactant target is a rotating wheel to allow uniform reactant release from the target 61. The reactant atoms 48 migrate toward the plasma 50 to be deposited on the substrate 20. The target 61 may comprise, for example, Zn, In, Al, In:Zn, Al:Zn, ZnO, IZO or AZO. If the target 61 contains oxygen, then a separate source of oxygen may be omitted. Likewise, the nozzle 18 may be omitted.

In another embodiment of the invention, both the adhesion promoting layer 2 and the UV absorption layer 3 are formed in the same arc plasma deposition apparatus. Preferably, the adhesion promoting layer 2 comprises a metal, such as Al or Ag and the UV absorbing layer 3 comprises a metal oxide layer, such as ZnO, IZO or AZO. In one aspect of this embodiment, Al or Ag layer may be formed by supplying Al or Ag reactant through one of the reactant supply pipes. For example, as shown in FIG. 5A, Al or Ag may be supplied through line 16, Zn, In and/or Al may be supplied through line 14 and oxygen through line 12. First, Al or Ag is supplied through line 16 with the other supply lines being inactive or shut off. The Al or Ag reactant enters an inert gas plasma 50, such as an Ar plasma. The plasma 50 deposits an Al or Ag adhesion layer 2 on the substrate 20. Thereafter, the flow of Al or Ag is stopped, and Zn, In and/or Al and oxygen flow is started from lines 14 and 12 to form a ZnO, IZO or AZO UV absorbing layer 3 on the adhesion promoting layer 2. Alternatively, if an Al adhesion promoting layer and an AZO UV absorption layer is desired, the Al reactant flow may continue during deposition of both layers 2 and 3.

The sources of Al and Ag for the adhesion promoting layer 2 may be similar to the Zn sources used for deposition of the UV absorbing layer 3. For example, if Al is used, a metal organic gas, such as trimethyl aluminum (TMA) or triethyl aluminum (TEA) may be used. Alternatively, Al or Ag may be evaporated from a crucible such as those shown in FIGS. 6A and 6C. These crucibles should be formed in addition to the Zn and/or In crucibles if it is desired to evaporate Zn and/or In. Alternatively, Al or Ag reactants may be sputtered or e-beam evaporated into the plasma from a target, such as those shown in FIGS. 6D and 6E.

It should be apparent that any combination of metal sources shown in FIGS. 5A and 6A–E may be used to deposit the ZnO, AZO and/or IZO layer 3 and the Al or Ag layer 2. For example, Zn may be evaporated from crucible 45 through pipe 44, while Al or Ag may be evaporated from a second crucible through pipe 46 or from crucible 55, or vise versa. Alternatively, Zn and/or In may be evaporated from crucible 45, while Al or Ag may be sputtered or evaporated from targets 56 or 61, or supplied in the form of a gas, or vise versa.

Figure 7:
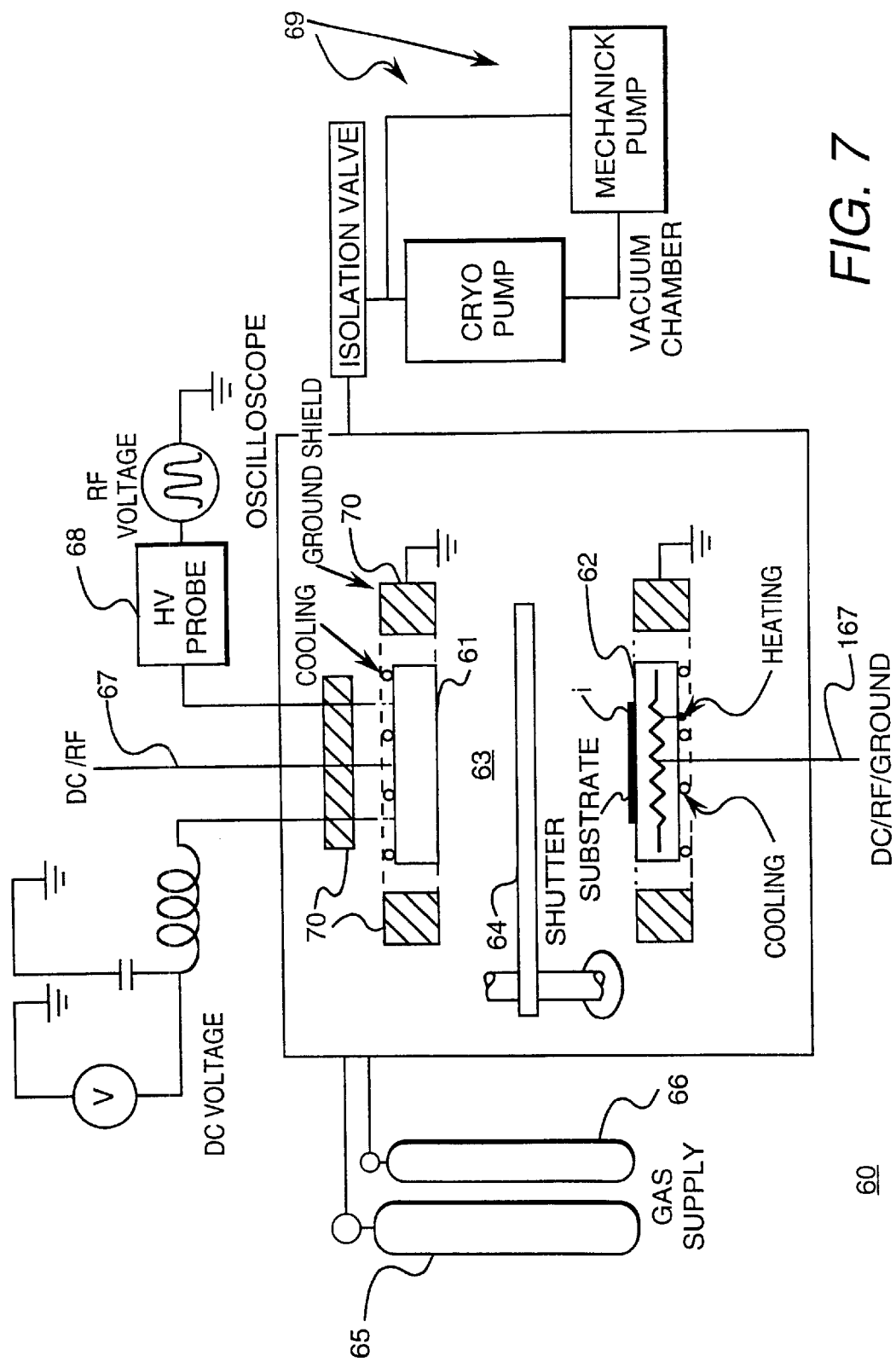
FIG. 7 is a side cross sectional view of an apparatus used to manufacture the glazed substrate according to another embodiment of the present invention.

In an alternative embodiment of the present invention, the UV absorbing layer 3 is formed by reactive sputtering, as shown in FIG. 7. The reactive sputtering apparatus 60 comprises a reactant target 61, a substrate support 62, a plasma reaction space 63 between the support and the target, an optional shutter 64 that separates the target from the support, a plasma gas supply tank 65, a reactant gas supply tank 66, DC or RF voltage supply lines 67 and 167. The apparatus may optionally comprise a testing probe/oscilloscope 68. The apparatus is evacuated by at least one mechanical and/or cryopump 69. The target 61 may be cooled by flowing water on its back side. The support 62 may be heated, cooled or biased as required. In case more precise control of the plasma is desired, magnets 70 may be added to form a DC or RF magnetron sputtering apparatus.

To form a ZnO layer 3, the target 61 preferably comprises solid Zn. However, the target may comprise ZnO. The chamber 63 is pumped down by pump(s) 69. A sputtering gas, such as argon, may be filled into space 63 from gas supply tank 65. Preferably, the Ar gas may be used in combination with another gas, such as oxygen or $N_2O$ from tank 66, to perform reactive sputtering. For example, the argon may contain 7–25% oxygen, typically 18% oxygen. A DC or RF voltage may be applied to the target, which causes the sputtering gas to form a plasma. The plasma atoms and ions bombard the target due to the negative charge applied to the target. The plasma bombardment causes reactant atoms to be sputtered off from the target 61 and to drift toward the substrate 1 on the support 62. The reactant atoms, such as Zn atoms combine with the reactant gas, such as oxygen, present in the plasma to form a thin film on the substrate. Of course, the ZnO may be sputtered from a ZnO target with or without the supply of a reactive oxygen gas into the plasma. To form an IZO film 3 on substrate 1, the target 61 may comprise an In:Zn alloy, such as 2.5 atomic % indium containing In:Zn alloy or IZO. Alternatively, mosaic targets of Zn and In or ZnO and In may be used to form an IZO layer. To form an AZO film 3 on substrate 1, the target 61 may comprise an Al:Zn alloy or AZO. Alternatively, mosaic targets of Zn and Al or ZnO and Al may be used to form an AZO layer. Alternatively, adjacent but separate Zn and In or Al targets may be used to form the IZO or AZO film 3.

Furthermore, by covering the target 61 with shutter 64 and applying a negative charge to the support 62, the Ar plasma may be used to bombard the substrate 1. This causes the plasma to sputter clean the substrate 1 and/or the deposited Al or Ag layer 2 prior to depositing layer 3. This increases process throughput by eliminating a separate cleaning step in a separate chamber.

Figure 8:
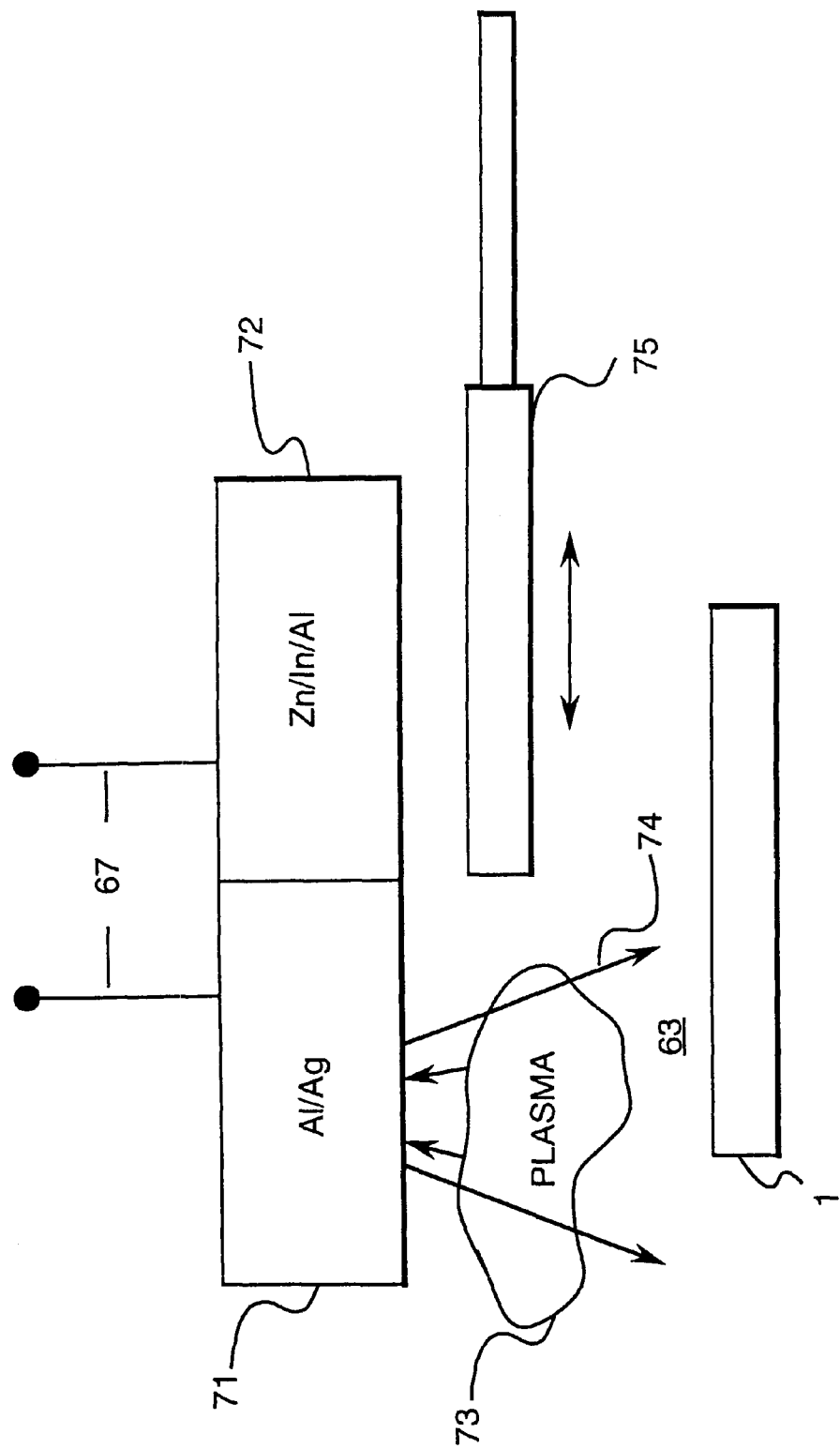
FIG. 8 is a side cross sectional view of an apparatus used to manufacture the glazed substrate according to another embodiment of the present invention.

In an alternative embodiment, layers 2 and 3 may be deposited in the same sputtering chamber, as shown in FIG. 8. The target according to the current embodiment may comprise an Al or Ag portion 71 and a Zn, In:Zn or Al:Zn portion 72. Alternatively, there may be two separate targets 71 and 72. First, DC or RF voltage is applied to target portion 71, while portion 72 may be covered with a shutter 75. Alternatively, if there is only one voltage supply line 67 to both target portions 71 and 72, then portion 72 is simply covered by shutter 75. The plasma 73 only bombards the uncovered target portion 71, causing only Al or Ag atoms 74 to be sputtered toward the substrate 1. Thus, the Al or Ag film 2 is sputter deposited on substrate 1.

The support is then positively biased to sputter clean the Al or Ag layer 2 using the Ar plasma 73. The substrate 1 may be similarly cleaned before depositing layer 2. However, the cleaning step may be omitted. After the cleaning step, oxygen is released into chamber 63 from tank 66, the target portion 72 is positively biased, while target portion 71 is either unbiased, covered by shutter 75 or both. The plasma 73 bombards only target portion 72 to sputter off Zn and/or In or Al atoms. The Zn and/or In or Al atoms combine with the oxygen atoms in the plasma to form a ZnO, IZO or AZO layer 3 on Al or Ag layer 2. Alternatively, if the target portion 72 comprises ZnO, IZO or AZO, then oxygen may be omitted from the plasma. Forming layers 2 and 3 and carrying out sputter cleaning in the same chamber greatly enhances process speed and throughput. Furthermore, the substrate 1 may be baked in vacuum at 70–110° C. for 10–14 hours prior to layer deposition.

Specific examples of the present invention are described below. It should be understood that the examples are meant to merely illustrate the present invention and should not be deemed as limiting the scope of the claims. In the following examples, the water soak test involves submerging the article in 65° C. water for a specified time. The adhesion strength measurement was carried out on a Sebastian Tensile Pull Tester.

EXAMPLE 1

A polycarbonate substrate was cleaned in isopropyl alcohol and then plasma etched at a power of 50 W and pressure of 4.0 Pa (30 millitorr) in an Ar plasma. A 10 nm coating of Al was then sputtered onto the substrate from an Al target in an Ar plasma at power of 100 W and a pressure of 1.07 Pa (8 millitorr). The distance from the target to the substrate was about 4.13 cm (1⅝ inches). A ZnO layer was then formed on the Al covered substrate by reactive sputtering from a ZnO target in an 18% oxygen/argon plasma at a pressure of 1.07 Pa (8 millitorr).

The initial adhesion of the ZnO layer to the Al/PC substrate was 2.07 MPa (0.3 thousand pounds per square inch, Klb/in$^2$) (MPa=10$^6$ Pa). The ZnO/Al coated substrate was subjected to the water soak test by being placed in 65° C. distilled water for 4 days. The ZnO deposited over Al showed no signs of cracking or delamination. The adhesion strength after the weathering test was 2.07 MPa (0.3 Klb/in$^2$). Therefore, the ZnO layer did not suffer a decrease in adhesion strength to Al/PC after the weathering test.

EXAMPLE 2

The experiment of example 1 was repeated under identical conditions, except that the PC substrate was replaced by a PPC substrate. The initial adhesion of the ZnO layer to the Al/PPC substrate was 8.27 MPa (1.2 Klb/in$^2$). After the weathering test, the adhesion strength of the ZnO to the Al/PPC substrate was 1.38 MPa (0.2 Klb/in$^2$). The ZnO layer showed evidence of peeling from the substrate. Therefore, the ZnO layer suffered a decrease in adhesion strength to the substrate during the weathering test.

EXAMPLE 3

The experiment of example 1 was repeated under identical conditions, except that the PC substrate was replaced by a PES substrate. The initial adhesion of the ZnO layer to the Al/PES substrate was 25.5 MPa (3.7 Klb/in$^2$). After the weathering test, the adhesion strength of the ZnO to the Al/PES substrate was 6.21 MPa (0.9 Klb/in$^2$). The ZnO deposited over Al showed no signs of cracking or delamination. Even though the ZnO layer suffered a decrease in adhesion strength to the substrate after the weathering test, the residual adhesion strength was more than sufficient to prevent ZnO peeling, cracking and delamination.

EXAMPLE 4

The experiment of example 1 was repeated under identical conditions, except that the PC substrate was replaced by a PEI (polyimide) substrate. The initial adhesion of the ZnO layer to the Al/PEI substrate was 11.7 MPa (1.7 Klb/in$^2$). After the weathering test, the adhesion strength of the ZnO to the Al/PEI substrate was 11.0 MPa (1.6 Klb/in$^2$). The ZnO deposited over Al showed no signs of cracking or delamination. The ZnO suffered a mere 6% decrease in adhesion strength to the Al covered substrate.

EXAMPLE 5

The experiment of example 1 was repeated under identical conditions, except that the PC substrate was replaced by a glass substrate. The initial adhesion of the ZnO layer to the Al/glass substrate was 56.5 MPa (8.2 Klb/in$^2$). After the weathering test, the adhesion strength of the ZnO to the Al/glass substrate was 17.2 MPa (2.5 Klb/in$^2$). The ZnO deposited over Al showed no signs of cracking or delamination. Even though the ZnO layer suffered a decrease in a adhesion strength to the substrate after the weathering test, the residual adhesion strength was more than sufficient to prevent ZnO peeling, cracking and delamination.

EXAMPLE 6

The experiment of example 1 was repeated under identical conditions, except that the Al thickness was increased from 10 nm to 40 nm. The initial adhesion of the ZnO layer to the Al/PC substrate was 4.14 MPa (0.6 Klb/in$^2$). After the weathering test, the adhesion strength of the ZnO to the Al/PC substrate was 4.14 MPa (0.6 Klb/in. Therefore, the ZnO layer did not suffer a decrease in adhesion strength to Al/PC after the weathering test. The ZnO deposited over Al showed no signs of cracking or delamination.

EXAMPLE 7

The experiment of example 2 was repeated under identical conditions, except that the Al thickness was increased from 10 nm to 40 nm. The initial adhesion of the ZnO layer to the Al/PPC substrate was 8.96 MPa (1.3 Klb/in$^2$). After the weathering test, the adhesion strength of the ZnO to the Al/PPC substrate was 8.27 MPa (1.2 Klb/in$^2$). The ZnO deposited over Al showed no signs of cracking or delamination. Therefore, the ZnO layer suffered only a modest 8% loss of adhesion strength to the substrate.

EXAMPLE 8

The experiment of example 3 was repeated under identical conditions, except that the Al thickness was increased from 10 nm to 40 nm. The initial adhesion of the ZnO layer to the Al/PES substrate was 24.1 MPa (3.5 Klb/in$^2$) After the weathering test, the adhesion strength of the ZnO to the Al/PES substrate was 23.4 MPa (3.4 Klb/in$^2$). The ZnO deposited over Al showed no signs of cracking or delamination. Therefore, the ZnO layer suffered only a modest 3% loss of adhesion strength to the substrate.

EXAMPLE 9

The experiment of example 4 was repeated under identical conditions, except that the Al thickness was increased from 10 nm to 40 nm. The initial adhesion of the ZnO layer to the Al/PEI substrate was 12.4 MPa (1.8 Klb/in$^2$). After the weathering test, the adhesion strength of the ZnO to the Al/PEI substrate was 13.1 MPa (1.9 Klb/in$^2$). The ZnO deposited over Al showed no signs of cracking or delamination. Therefore, the adhesion strength to the substrate did not deteriorate after the weathering test.

Comparative Examples 1–5

The experiments of examples 1–5 were repeated under identical conditions, except that the Al adhesion layer was omitted. The ZnO layer deposited directly on PC, PPC, PES and PEI substrates cracked and delaminated after the weathering test (i.e. its adhesion strength was zero). The ZnO layer deposited on a glass substrate did not exhibit any change in adhesion strength after the weathering test. However, the adhesion strength of the ZnO layer to the glass substrate was only 3.45 MPa (0.5 Klb/in$^2$), while the initial adhesion strength of the ZnO layer to the Al covered glass substrate in example 5 was 56.5 MPa (8.2 Klb/in$^2$).

The results of examples 1–9 and comparative examples 1–5 are summarized in a table below.

TABLE

| Example # | Substrate | Adhesion Layer | UV Layer | Initial Adhesion (MPa) | Post Test Results 65° C. water 4 days | Post Test Adhesion (MPa) |
|---|---|---|---|---|---|---|
| Example 1 | PC | Al 10 nm | ZnO 500 nm | 2.07 | No change | 2.07 |
| Example 2 | PPC | Al 10 nm | ZnO 500 nm | 8.27 | Peeling | 1.38 |
| Example 3 | PES | Al 10 nm | ZnO 500 nm | 25.5 | No change | 6.21 |
| Example 4 | PEI | Al 10 nm | ZnO 500 nm | 11.7 | No change | 11.0 |
| Example 5 | Glass | Al 10 nm | ZnO 500 nm | 56.5 | No change | 17.2 |
| Example 6 | PC | Al 40 nm | ZnO 500 nm | 4.14 | No change | 4.14 |
| Example 7 | PPC | Al 40 nm | ZnO 500 nm | 8.96 | No change | 8.27 |
| Example 8 | PES | Al 40 nm | ZnO 500 nm | 24.1 | No change | 23.4 |
| Example 9 | PEI | Al 40 nm | ZnO 500 nm | 12.4 | No change | 13.1 |
| Comparative Example 1 | PC | none | ZnO 500 nm | 1.38 | ZnO cracked & delaminated | |
| Comparative Example 2 | PPC | none | ZnO 500 nm | 16.5 | ZnO cracked & delaminated | |
| Comparative Example 3 | PES | none | ZnO 500 nm | 32.4 | ZnO cracked & delaminated | |
| Comparative Example 4 | PEI | none | ZnO 500 nm | 11.0 | ZnO cracked & delaminated | |
| Comparative Example 5 | Glass | none | ZnO 500 nm | 3.45 | No change | 3.45 |

As may be seen from the above table, the adhesion layer of a preferred embodiment of the present invention is suitable for a variety of glass and polymeric substrates. The metal oxide layer (ZnO) deposited on an adhesion layer did not delaminate in any example.

The ZnO deposited directly on the polymeric substrates cracked and delaminated in every comparative example. The ZnO layer deposited on a 10 nm Al layer over a PPC substrate in example 2 showed evidence of peeling. However, the ZnO layer deposited on a 40 nm Al layer over a PPC substrate in example 7 showed no evidence of peeling, and only an 8% loss in adhesion strength after the weathering test. Therefore, it is preferred that a thicker adhesion layer, such as a 40 nm adhesion layer, is used between a ZnO layer and a PPC substrate.

The thicker adhesion layer is also preferred, but not required for a PES substrate. As may be seen from examples 3 and 8, a ZnO layer deposited on a 40 nm Al layer showed a much smaller decrease in adhesion strength than a ZnO layer deposited on a 10 nm Al layer. However, even the ZnO layer deposited on the 10 nm Al layer in example 3 showed an acceptable adhesion strength after the weathering test.

The Al adhesion layer works extremely well with a PC substrate. ZnO layers deposited on 10 nm and 40 nm Al layers over a PC substrate showed no decrease in adhesion strength after the weathering test.

The adhesion layer of the present invention is even advantageous for glass substrates. As shown in example 5 and comparative example 5, the Al adhesion layer increased the initial adhesion strength of the ZnO layer to glass by over 16 times, and the post weathering test adhesion strength by five times.

While the invention has been described in detail and with reference to specific embodiments thereof, it will be apparent to one skilled in the art that various changes and modifications can be made therein without departing from the spirit and scope of the invention.

What is claimed is:

1. A multilayer structure, comprising:
  a polymeric substrate;
  a transparent metal layer on the substrate; and
  a transparent metal oxide layer including at least one compound selected from the group consisting of ZnO, indium doped zinc oxide, and aluminum doped zinc oxide,
  wherein the metal oxide layer is in direct contact with the metal layer, and the adhesion strength between the metal oxide layer and the substrate is
  a) 2.07 MPa or greater; and
  b) decreases by no more than 10% after being submerged for 4 days in distilled water at 65 degrees C.

2. The multilayer structure of claim 1, wherein the substrate is a transparent polymeric material.

3. The structure of claim 2, wherein the transparent polymeric material comprises polycarbonate, polyestercarbonate, polyethersulfone or polyetherimide.

4. The structure of claim 1, wherein the metal layer comprises at least one of aluminum and silver.

5. The structure of claim 1, wherein the metal layer is substantially transparent to visible light.

6. The structure of claim 5, wherein the metal layer is 10 to 40 nm thick.

7. The structure of claim 1, wherein the metal layer is in direct contact with the substrate.

8. The structure of claim 1, further comprising a stress reducing interlayer between the substrate and the metal layer.

9. The structure of claim 8, wherein the stress reducing interlayer comprises a plasma polymerized organosilicon material.

10. The structure of claim 1, wherein the metal layer and the metal oxide layer are formed on more than one side of the substrate.

11. The structure of claim 1, wherein the substrate is transparent, the metal layer comprises aluminum or silver, and the metal oxide layer comprises ZnO, IZO or AZO.

12. The structure of claim 1, wherein the metal oxide layer comprises $TiO_2$, $CeO_2$, or ZnS.

13. The structure of claim 11, wherein the substrate comprises polycarbonate, polyestercarbonate, polyethersulfone or polyetherimide, the metal comprises aluminum, and the metal oxide comprises ZnO.

14. The structure of claim 13, wherein the ZnO is in direct contact with aluminum, and wherein the adhesion strength between the ZnO and the aluminum is either:
  a) 2.07 MPa or greater; or
  b) decreases by 10% or less; after being submerged for 4 days in distilled water at 65 degrees C.

15. The structure of claim 1, wherein:
the substrate comprises a vehicle window, an apparatus window, a building window, a display screen, or an electronic device substrate;
the metal layer comprises at least one of an infrared radiation reflection layer and an adhesion promoting layer; and
the metal oxide layer comprises an ultraviolet radiation absorption layer or a transparent electrode layer.

16. The structure of claim 1, wherein the metal oxide layer is 200 to 10,000 nm thick.

17. A method of coating a polymeric substrate, comprising the steps of:
forming a transparent metal layer over the substrate; and
forming a transparent metal oxide layer including at least one compound selected from the group consisting of ZnO, indium doped zinc oxide, and aluminum doped zinc oxide,
wherein the metal oxide layer is in direct contact with the metal layer, and the adhesion strength between the metal oxide layer and the substrate is
a) 2.07 MPa or greater; and
b) decreases by no more than 10% after being submerged for 4 days in distilled water at 65 degrees C.

18. The method of claim 17, wherein the substrate comprises a transparent polymeric material.

19. The method of claim 18, wherein the transparent polymeric material comprises polycarbonate, polyestercarbonate, polyethersulfone or polyetherimide.

20. The method of claim 17, wherein the metal layer comprises at least one of aluminum and silver.

21. The method of claim 17, wherein the metal layer is substantially transparent to visible light.

22. The method of claim 21, wherein the metal layer is 10 to 40 nm thick.

23. The method of claim 17, wherein the metal oxide comprises at least one of $TiO_2$, $CeO_2$, and ZnS.

24. The method of claim 17, wherein the step of forming a metal layer comprises forming the metal layer directly on the substrate.

25. The method of claim 17, further comprising the step of forming an abrasion resistant layer on the metal oxide layer.

26. The method of claim 25, wherein the abrasion resistant layer comprises silicon dioxide, alumina, acrylic or a plasma polymerized organosilicon material.

27. The method of claim 25, further comprising step of forming at least one stress reducing interlayer comprising aluminum or a plasma polymerized organosilicon between
the substrate and the metal layer; or
between the metal oxide layer and the abrasion resistant layer.

28. The method of claim 27, wherein at least two of the stress reducing interlayer, the abrasion resistant layer, the metal layer and the metal oxide layer are formed in same processing chamber.

29. The method of claim 17, wherein the metal layer and the metal oxide layer are formed on more than one side of the substrate.

30. The method of claim 17, wherein the substrate comprises a polymer, the metal comprises aluminum or silver, and the metal oxide comprises ZnO or IZO.

31. The method of claim 30, wherein the substrate comprises polycarbonate, polyestercarbonate, polyethersulfone or polyetherimide, the metal comprises aluminum, and the metal oxide comprises ZnO.

32. The method of claim 31, wherein the ZnO is in direct contact with aluminum, and wherein the adhesion strength between the ZnO and the aluminum decreases by 10% or less after being submerged for 4 hours in distilled water at 65 degrees C.

33. The method of claim 17, wherein:
the substrate comprises a vehicle window, an apparatus window, a building window, a display screen, or an electronic device substrate;
the metal layer comprises at least one of an infrared radiation reflection layer and an adhesion promoting layer; and
the metal oxide layer comprises an ultraviolet radiation absorption layer or a transparent electrode layer.

34. The method of claim 17, wherein the metal oxide layer is 200 to 10,000 nm thick.

35. A transparent window usable in a vehicle, a building, a display device or an apparatus, comprising
a polycarbonate, polyestercarbonate, polyethersulfone or polyetherimide substrate;
an infrared radiation reflection layer comprising aluminum or silver; and
an ultraviolet radiation absorption layer including at least one compound selected from the group consisting of ZnO, indium doped zinc oxide, and aluminum doped zinc oxide,
wherein the ultraviolet radiation absorption layer is in direct contact with the infrared radiation reflection layer, and the adhesion strength between the ultraviolet radiation absorption layer and the substrate is
a) 2.07 MPa or greater; and
b) decreases by no more than 10% after being submerged for 4 days in distilled water at 65 degrees C.

36. The window of claim 35, further comprising:
a scratch resistant coating comprising alumina, silicon dioxide, acrylic or a plasma polymerized organosilicon material on the ultraviolet radiation absorption layer.

37. The window of claim 36, further comprising:
a first polymerized organosilicon interlayer adjacent to the infrared radiation reflection layer; and
a second polymerized organosilicon or aluminum interlayer adjacent to the scratch resistant coating.

38. The window of claim 35, wherein the metal oxide layer is 200 to 10,000 nm thick.

* * * * *